(12) United States Patent
Lin et al.

(10) Patent No.: US 10,246,607 B2
(45) Date of Patent: Apr. 2, 2019

(54) RESIN COMPOSITION, COATING COMPOSITION AND ARTICLE BY USING THE SAME

(71) Applicant: CHANG CHUN PLASTICS CO., LTD., Taipei (TW)

(72) Inventors: Ying-Jui Lin, Taipei (TW); Yung-Sheng Lin, Taipei (TW); I-Chiang Lai, Taipei (TW); Kuen-Yuan Hwang, Taipei (TW); Yi-Sern Wong, Taipei (TW)

(73) Assignee: CHANG CHUN PLASTICS CO., LTD., Taipei (TW)

( * ) Notice: Subject to any disclaimer, the term of this patent is extended or adjusted under 35 U.S.C. 154(b) by 0 days.

(21) Appl. No.: 16/035,038

(22) Filed: Jul. 13, 2018

(65) Prior Publication Data

US 2019/0023936 A1   Jan. 24, 2019

Related U.S. Application Data

(60) Provisional application No. 62/535,081, filed on Jul. 20, 2017.

(51) Int. Cl.
*C09D 163/00* (2006.01)
*C09D 5/08* (2006.01)

(52) U.S. Cl.
CPC ............ *C09D 163/00* (2013.01); *C09D 5/08* (2013.01)

(58) Field of Classification Search
CPC .................................................. C09D 163/00
USPC ........................................................ 428/413
See application file for complete search history.

(56) References Cited

U.S. PATENT DOCUMENTS

| 2014/0168580 A1* | 6/2014 | Huh | ..................... | G02B 5/3033 349/96 |
| 2017/0260294 A1* | 9/2017 | Toyama | ................... | C08L 1/14 |

* cited by examiner

*Primary Examiner* — Megan McCulley
(74) *Attorney, Agent, or Firm* — Nixon Peabody LLP; Thomas P. Pavelko

(57) ABSTRACT

An epoxy resin composition comprising a blend of at least (i) at least one epoxy group containing a polycyclic group, and (ii) at least one epoxy group that is different from the epoxy resin in component (i). As exemplary of component (i) is an epoxidized tricyclo decanedimethanol. A renewable epoxy of component (ii) is cardanol epoxy, derived from cashew nut shell oil (CNSL). Optionally, a component (iii) which is any other epoxy from that of (i) and (ii) can be included, such as Bisphenol-A/F diglycidal ether. The blend is characterized by low viscosity, making it amenable to airless spray application, high solids content and excellent solvent resistance and abrasion resistance.

19 Claims, No Drawings

RESIN COMPOSITION, COATING COMPOSITION AND ARTICLE BY USING THE SAME

CROSS REFERENCE TO RELATED APPLICATIONS

This non-provisional application claims domestic benefit of U.S. provisional patent application Ser. No. 62/535,081, filed Jul. 20, 2017, the entire contents of which are herein incorporated by reference in its entirety.

FIELD

This application is directed to novel resin compositions, coating compositions and articles of manufacture incorporating the same, which the coating compositions have high solids content, low volatile organic compound ("VOC"); and low viscosity.

BACKGROUND

Epoxy based anti-corrosion coatings are widely used for the protection of metal and concrete substrates. Since the future of anti-corrosion coatings will be strongly influenced by environmental legislation and economic constraints, low VOC coating system attract more and greater attention from both paint producers and end customers. In addition, it is the trend that the biomass resources will replace petrochemical products in anti-corrosion coatings to gradually increase sustainability.

In this respect, one approach to achieve low VOC coating is to prepare high solids content coating with reduced solvent addition using low viscosity epoxy. For example, BE-501 (commercial product of Chang Chun Plastics Co., Inc. of Taiwan (hereinafter "CCP")) are widely used in anti-corrosion coatings. However, since BE-501 is the epoxy resin with solid type, large amount of solvent is demanded to dissolve to dilute such resin. Generally, 25% xylene is mixed with BE-501 and sold as the commercial grade stated "BE-501X75". Consequently, BE-501 hinders the epoxy resin from low VOC high solid content application.

The coating based on liquid epoxy such as BE-188 (commercial product of CCP) requires less solvent, however, is quite brittle. This is a critical issue for an anti-corrosion coating which requires high flexibility and good adhesion on substrates. Furthermore, the viscosity of the coating composition prepared from liquid epoxy is generally high and thus has poor processability.

Another approach is to include reactive diluents in the composition to significantly reduce the viscosity of the system. However, such diluents also have some disadvantages. For example, the reactive diluents will result in reduced performance properties, such as decreased chemical resistance, decreased impact resistance, decreased water resistance, and reduced corrosion resistance of the resulting coating compositions and articles of manufacture incorporating the same. In addition, the drying time of these compositions is long.

Given the foregoing, it is clear that there is a long-felt need for a coating composition with the properties of low viscosity and rapid curing rate, which exhibit good properties for chemical resistance, impact resistance, water resistance, and corrosion resistance, and which can be formulated from renewable sources.

SUMMARY

The use of biomass resources to replace petrochemicals in anti-corrosion coatings to gradually increase sustainability is one of the aims of this disclosure.

To achieve the foresaid objective, the present invention provides a resin composition. The resin composition comprises a component (i): an epoxy resin comprising an epoxidized tricyclo decanedimethanol (hereinafter "epoxidized TCDDM"), and a component (ii): an epoxy resin comprising an epoxidized cardanol.

One of the principal sources of reactants extracted from natural materials or prepared by industrial manufacturing is cardanol, an extract of the cashew nutshell liquid ("CNSL"), a byproduct of cashew nut processing. Cardanol can be readily epoxidized to form a component of the compositions according to the instant disclosure.

The present invention also provides a coating composition which includes the resin composition and a hardener. The coating compositions comprises a high solids content and a low yield of VOC; exhibits a low viscosity; rapid curing; and capable of providing articles of manufacture with improved coating flexibility and impact resistance.

According to another embodiment of this disclosure, viscosity of the coating composition is amenable to airless spray application.

According to a still further embodiment of this disclosure, we provide the coating composition with a solids content in excess of about 90% by weight, based on the total weight of the coating composition; for example, in the range of about 90 wt. % to about 99 wt. %, or within the following preferred ranges, but not limited to, more than about 90 wt. %, more preferably more than about 95 wt. %.

According to a further embodiment of this disclosure, we provide the coating composition with a viscosity of at most about 2000 cps, preferably, at most about 1800 cps.

According to a still further embodiment, we provide the coating composition with a VOC of at most about 85 g/L, preferably, at most about 70 g/L.

According to a still further embodiment according to this disclosure, the coating composition providing a useful pot-life, reasonable tack-free drying time of less than about 3 hours and dry-hard time of less than about 5.3 hours are attainable.

We also provide an article of manufacture comprising a substrate and a coating comprising the aforementioned coating composition. More specifically, the coating is formed by curing the coating composition.

According to still further embodiments of this disclosure, articles of manufacture in the form of coated articles which pass an impact test of at least of about 500 g/50 cm having a pencil hardness of at least of H and pass a MEK rub test of at least of about 200 are attainable.

These and other embodiments of this disclosure will be better understood upon reading the following detailed description in connection with the examples.

DETAILED DESCRIPTION

The following will describe some embodiments of the present application in detail. However, without departing from the spirit of the present application, the present application may be embodied in various embodiments and should not be limited to the embodiments described in the specification. In addition, unless otherwise stated herein, the expressions "a," "the," and the like recited in this specification (especially in the claims) are intended to include the singular and plural forms. In addition, the term "about", "approximately" or "almost" used in this specification substantially represents within ±20% of the stated value, preferably within ±10% and more preferably within ±5%.

In general, the resin composition of the disclosure include:
a component (i): at least one epoxy resin that contains a polycyclic group; and
a component (ii): at least one epoxy resin that is different from the epoxy group in component (i) in that it does not contain a polycyclic group.

In some cases, the resin composition includes (i) an epoxy resin comprising an epoxidized tricyclo decanedimethanol; and an epoxy resin comprising an epoxidized cardanol.

It should be understood that the polycyclic group used in the present disclosure is a substituent formed by two or more carbocyclic or heterocyclic rings joining on adjacent carbons. For example, an epoxy resin comprising an epoxidized TCDDM can be useful for present disclosure as the component (i). Furthermore, component (i) of the present composition (i.e., the epoxy resin having at least one polycyclic group, e.g., epoxidized TCDDM) can be present in an amount in the range of from about 1 wt. % to about 20 wt. %, preferably from about 5 wt. % to about 20 wt. % based on the total weight of the epoxy resin composition.

As to the component (ii), for example, an epoxy resin comprising epoxidized cardanol is useful. After repeatedly experimentations, the amount of the component (ii) (e.g., epoxidized cardanol) can be present in the range of from about 1 wt. % to about 20 wt. %, preferably from about 5 wt. % to about 20 wt. % based on the total weight of the epoxy resin composition.

In addition, even though component (ii) is at least one epoxy resin other than the epoxy of component (i), that there can be optionally added (iii) additional epoxy resins other than the epoxy resins present in component (i) and component (ii). For example, the epoxy resin may be, but not limited to epoxidized bisphenol A, bisphenol F, phenol or the combinations thereof in an amount in the range of from about 10 wt. % to about 80 wt. %, preferably from about 15 wt. % to about 70 wt. % based on the total weight of the epoxy resin composition.

As exemplary of the component (i), we have used a epoxidized TCDDM, specifically a tricyclo [5.2.1.0$^{2,6}$] decanedimethanol. TCDDM has the empirical formula $C_{12}H_{20}O_2$. Its structure can be seen in the following formula (I):

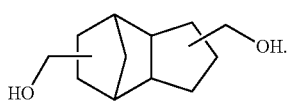
(I)

However, after other compounds of the TCDDM of general formula (I) are epoxidized, they are also suitable for use according to this disclosure. They include 3,8-bis(hydroxymethyl)tricyclo[5.2.1.0$^{2-6}$]decane; 3,9-bis(hydroxymethyl)tricyclo[5.2.1.0$^{2-6}$]decane; 4,8-bis(hydroxymethyl)tricyclo[5.2.1.0$^{2-6}$]decane; 4,9-bis(hydroxymethyl)tricyclo[5.2.1.0$^{2-6}$]decane; 5,8-bis(hydroxymethyl)tricyclo[5.2.1.0$^{2-6}$]decane; 5,9-bis(hydroxymethyl)tricyclo[5.2.1.0$^{2-6}$]decane or combinations thereof.

In order to obtain an epoxy compound having a plurality of epoxy groups from a polyhydric alcohol having a cyclic hydrocarbon group and an epihalohydrin in a high yield and in single step reaction, it was found that when the reaction is carried out in the presence of a phase transfer catalyst, an epoxy compound having a plurality of epoxy groups can be obtained with good yield. Examples of the phase transfer catalyst include a basic inorganic reagent, a quaternary ammonium salt, a phosphonium salt, a crown ether, a cryptand, an amine compound, and the like. Examples of the quaternary ammonium salt include a quaternary ammonium halide and an acidic sulfate of a quaternary ammonium. Examples of the phosphonium salt include ethyl triphenyl phosphonium acetate, triphenyl phosphonium, and the like. Examples of the basic inorganic reagent include sodium hydroxide, potassium hydroxide, and the like. Examples of the quaternary ammonium halide include benzyltrimethylammonium halide, benzyltriethylammonium halide, trioctylmethylammonium halide, cetyltrimethylammonium halide, and the like. Examples of crown ethers include 12-crown-4, 15-crown-5, 18-crown-6, 24-crown-8, and the like. Examples of cryptands include cryptand [2.2], cryptand [2.1.1], cryptand [2.2.1], cryptand [2.2.2], and the like. Examples of amines include trimethylethylene diamine, trimethylamine, and the like. Of these phase transfer catalysts, a quaternary ammonium salt is preferred. By using a phase transfer catalyst, it is possible to suppress by-production of a compound in which only a part of hydroxyl groups, such as monoepoxy, is epoxidized. Further, in order to facilitate the reaction, it is possible to obtain epoxy compounds having a plurality of aimed for epoxy groups in high yield.

The objective epoxy compound is a compound in which all polyhydric alcohol groups are epoxidized. The mixing ratio of the phase transfer catalyst is usually 0.001 to 0.1 mol, preferably 0.01 to 0.05 mol, per 1 mol of the OH group of the polyhydric alcohol having a cyclic hydrocarbon group.

The reaction between the polyhydric alcohol having a cyclic hydrocarbon group and an epihalohydrin can be carried out by mixing a polyhydric alcohol having a cyclic hydrocarbon group, an epihalohydrin, a base and a phase transfer catalyst in the presence of a solvent as required.

As suitable bases include the hydroxides of alkali metals, such as sodium hydroxide and potassium hydroxide, hydroxides of alkaline earth metals, such as calcium hydroxide, ammonia and ammonium salts, hydroxides of alkali metals is preferred, but one can use two or more bases in admixture. These bases are usually used in the reaction in the form of an aqueous solution of about 20 to about 55% by weight.

Examples of the solvent include ketones, such as methyl ethyl ketone and methyl isobutyl ketone, hydrocarbons, such as toluene and xylene, alcohols, such as methanol, ethanol, isopropyl alcohol, etc., cellosolves, such as methyl cellosolve, ethyl cellosolve, dimethyl cellosolve (dimethoxyethane ethers), etc., dioxane, dimethylsulfoxide, dimethylformamide, and the like. The solvent may be used as necessary, and may be used singly, or as a mixture of two or more kinds of solvent.

The reaction temperature is usually about −20° C. to about 200° C., preferably about 0 to about 150° C., and the reaction time is usually about 1 to about 20 hours, preferably about 1 to about 10 hours. Yields of multi-epoxy compounds having cyclic hydrocarbon group in a high yield of about 90% or more, preferably about 95% or more, by a single reaction step.

After the TCDDM is epoxidized, its structure would be shown in formula (II):

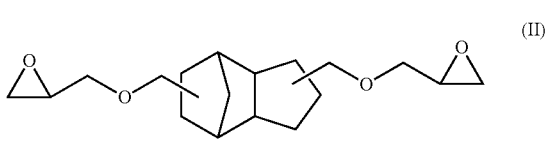

(II)

Isomers of the foregoing epoxidized compounds of formula (I) can also be used.

As exemplary of the component (ii), a particularly preferred modified resin was prepared from cardanol, the main constituent of cashew nut shell liquid (CNSL), a renewable source obtained by industrial manufacturing of, and as a byproduct of, cashew nut processing. Cardanol, derived from CNSL, has a reactive phenol group and aliphatic double bond that is exploited to produce novel functional materials for polymer and coating applications, and the formation of cardanol epoxy. Cardanol has the general formula (III):

(III)

wherein R is: $-C_{15}H_{25}$, $-C_{15}H_{27}$, $-C_{15}H_{29}$ or $-C_{15}H_{31}$.

Cardanol can be epoxidized to many different structures, including the following cardanol epoxy of general formula (IV):

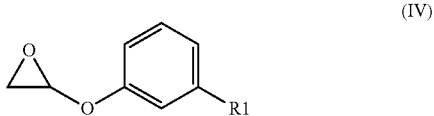

(IV)

wherein R1 is: $-C_{15}H_{25}$, $-C_{15}H_{27}$, $-C_{15}H_{29}$ or $-C_{15}H_{31}$.

With respect to component (iii), virtually any epoxy resin that is not included as the epoxy resin of component (i) and (ii) can be used. Glycidyl epoxy and non-glycidal epoxies can be used. Among the glycidyl epoxy can be mentioned glycidyl-amine, glycidyl ester and glycidyl ether. Non-glycidyl epoxies are either aliphatic or cycloaliphatic resins. Exemplary epoxies include Bisphenol-A diglycidal ether, Bisphenol-F diglycidal ether, Bisphenol B diglycidal ether, epoxidized Bisphenol BP, epoxidized Bisphenol E, epoxidized Bisphenol G, epoxidized Bisphenol P, epoxidized Bisphenol PH, epoxidized Bisphenol TMC, epoxidized Bisphenol Z, epoxidized Bisphenol-S, epoxidized Bisphenol-H, epoxidized Bisphenol-C, epoxidized Bisphenol-AF, epoxidized novolac, epoxidized phenol, epoxidized glycidylamine, brominated epoxy resin (more particularly, liquid and solid brominated epoxy resin), epoxidized cyclohexane-1,4-dimethanol, epoxidized decalin-2,6-dimethanol, epoxidized norbornane dimethanol, epoxidized dicyclopentadiene, epoxidized tricyclopentadiene, epoxidized pentacyclopentadecane, epoxidized tricyclodecane dicarbaldehyde, epoxidized pentacyclopentadecane dicarbaldehyde and modified resins of the foregoing.

Bisphenol A/F diglycidal ether has the general structural formula (VII):

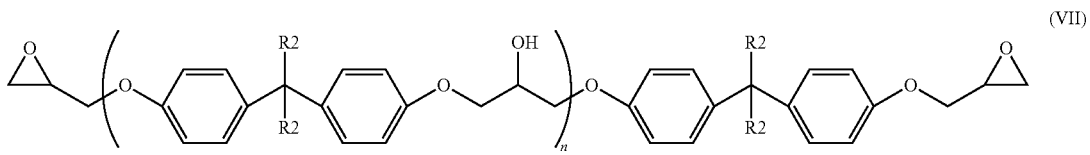

(VII)

where n is 0 or 1. Most preferably, n is 0. The average n value of the liquid epoxy resin (VII) is from 0 to 1. Preferably, it is from 0 to 0.5. Most preferably, it is from 0 to 0.3. R2 in general formula (VII) is independently $-H$ or $-CH_3$.

The epoxy components of (i), (ii), (iii) and any additional epoxy resin can be compounded in the form of a blend by mixing (i) with (ii), and then mixing any additional epoxy resin (iii) into the mixture of (i) and (ii). Alternatively, the blending of the components (i), (ii), (iii) and any additional epoxy resin, can take place in any order, simultaneously or sequentially added, or added in aliquots, until the complete formulation and blend is obtained. Mixing can take place intermittently or continuously during the addition of components until the complete blend is realized.

When making a coating composition, the resin composition comprising components (i) and (ii), as "Part A", is mixed with a hardener, as "Part B".

Hardeners can vary widely depending on the specific combination of the Part A components. As hardeners for a composition comprising epoxidized TCDDM and cardanol epoxy, the hardeners can be amines of polyamides or polyamines, combinations thereof, or derivatives thereof. Polyamines can be ethylenediamine, diethylenetriamine, triethylenetetraamine, tetraethylenepentamine or other ethyleneamines; isophorene diamine, bisaminomethylcyclohexane, bis(aminocyclohexyl)methane, metaxylene diamine, or diaminocyclohexane. Aforementioned derivatives may be adducts of any one or more of the aforementioned amines with epoxy resins; amides of any one or more of the aforementioned amines with fatty acids and dimer acids, Mannich bases of any one or more of the aforementioned amines, and mixtures thereof. Hardeners cause the epoxy compositions to "cure" or cross-link into a hard, infusible mass.

The coating composition can be essentially free of, or free of photo-initiators.

In addition to the Part A and Part B components, additives, such as fillers, pigments, reinforcing agents such as natural, synthetic or mineral fibers and combinations thereof, can be employed as desired. Examples of additives include titanium dioxide, calcium carbonate, fumed silica, and clays, such as bentonite.

Detailed embodiments will now be described in connection with various examples. However, it should be understood that these examples are not inclusive of all the manners in which formulations, compositions and coatings according to the present disclosure may be formulated. Therefore, the following recipes for creating epoxy resin compositions should be viewed as exemplary only, but not limiting of the scope of the present disclosure. The examples illustrate epoxy resins, blends of epoxy resins, compositions, coatings and cured products properties of low viscosity and rapid curing rate, which exhibit good properties for chemical resistance, impact resistance, water resistance, and corrosion resistance, and which can be formulated from renewable sources.

EXAMPLES

Example 1

1.1 Epoxy Resin

An initial epoxy resin composition is prepared by mixing 1152 g of a Bisphenol-A epoxy available from CCP, under the name BE-188, with 340 g of a Bisphenol-F epoxy, available from CCP under the name BFE-170, and 265.32 g of a Cardanol epoxy, available from CCP under the name BE-255SF. The three components can be mixed simultaneously, or by sequentially mixing two components, and then adding a third component; or adding each of the three components as aliquots until the 1.1 Recipe is formed. The below Table 1 illustrates the component materials and the amounts used to make the 1.1 epoxy resin.

1.1 Recipe

TABLE 1

| Material | CCP product name | weight |
|---|---|---|
| Bisphenol-A epoxy | BE-188 | 1152 g |
| Bisphenol-F epoxy | BFE-170 | 384 g |
| Cardanol epoxy | BE-255SF | 265.32 g |

The recipe 1.1 is mixed at the temperature of 90° C. After the components of the mixture are evenly mixed, adding 50 g of triphenyl phosphonium and heating to the temperature of 150° C. for 90 minutes is performed. After the process is complete, the "1.1 epoxy resin" (EEW (epoxy equivalent per weight): 232.6 g/eq; viscosity: 6300 cps@25° C.) is obtained.

1.2 Epoxy Resin

The initial 1.1 epoxy resin described above is utilized to form a 1.2 epoxy resin. Mixing 769 g of the 1.1 epoxy resin with an equal weight (769 g) of a Bisphenol-F epoxy (available from CCP under the name BFE-170) and 231 g of a Cardanol epoxy, available from CCP under the name CE-500, and 231 g of a TCDDM epoxy, obtained from Adeka Corporation (hereinafter "Adeka") under the names EP-4088S or EP-4088L to form the 1.2 epoxy resin. Table 2 illustrates the component materials and the amounts used to make the 1.2 epoxy. As with the 1.1 epoxy resin above, the components can be mixed in any order, simultaneously or sequentially, in total or in aliquots, until the 1.2 resin is obtained.

1.2 Recipe:

TABLE 2

| Material | CCP product name | weight |
|---|---|---|
| 1.1 epoxy resin | | 769 g |
| Bisphenol-F epoxy | BFE-170 | 769 g |
| Cardanol epoxy | CE-500 | 231 g |

TABLE 2-continued

| Material | CCP product name | weight |
|---|---|---|
| TCDDM epoxy | EP-4088S (Adeka) or EP-4088L (Adeka) | 231 g |

The recipe 1.2 is mixed at the temperature of 80° C. for 30 minutes and the "1.2 epoxy resin" (EEW: 203 g/eq; viscosity: 950 cps@25° C.) is obtained. For convenience, the 1.2 epoxy resin is referred to as "BE-200HS".

Example 2

2.1 Epoxy Resin

An initial epoxy resin composition is prepared by mixing 1152 g of a Bisphenol-A epoxy available from CCP, under the name BE-188, with 384 g of a Bisphenol-F epoxy, available from CCP under the name BFE-170, and 266.3 g of a Cardanol epoxy, available from CCP under the name BE-255SF. The three components can be mixed simultaneously, or by sequentially mixing two components, and then adding a third component; or adding each of the three components as aliquots until the 2.1 recipe is formed. Table 3 illustrates the component materials and the amounts used to make the 2.1 epoxy resin.

2.1 Recipe:

TABLE 3

| Material | CCP product name | weight |
|---|---|---|
| Bisphenol-A epoxy | BE-188 | 1152 g |
| Bisphenol-F epoxy | BFE-170 | 384 g |
| Cardanol epoxy | BE-255SF | 266.3 g |

The recipe 2.1 is mixed and processed the identical step disclosed in 1.1. After the process is complete, the "2.1 epoxy resin" (EEW: 233.2 g/eq; viscosity: 6300 cps@25° C.) is obtained.

2.2 Epoxy Resin

The initial 2.1 epoxy resin described above is utilized to form a 2.2 epoxy resin. Mixing 769 g of the 2.1 epoxy resin with an equal weight (769 g) of a Bisphenol-F epoxy (available from CCP under the name BFE-170) and 233 g of a Cardanol epoxy, available from CCP under the name CE-500, and 231 g of a TCDDM epoxy, obtained from Adeka under the names EP-4088S or EP-4088L to form the 2.2 epoxy. Table 4 illustrates the component materials and the amounts used to make the 2.2 epoxy. As with the 2.1 epoxy resin above, the components can be mixed in any order, simultaneously or sequentially, in total or in aliquots, until the 2.2 resin is obtained.

2.2 Recipe

TABLE 4

| Material | CCP product name | weight |
|---|---|---|
| 2.1 epoxy resin | | 769 g |
| Bisphenol-F epoxy | BFE-170 | 769 g |
| Cardanol epoxy | CE-500 | 233 g |
| TCDDM epoxy | EP-4088S (Adeka) or EP-4088L (Adeka) | 231 g |

The recipe 2.2 is mixed at the temperature of 80° C. for 30 minutes and the "2.2 epoxy resin" (EEW: 203.5 g/eq; viscosity: 945 cps@25° C.) is obtained.

Example 3

3.1 Epoxy Resin

An initial epoxy resin composition is prepared by mixing 1152 g of a Phenolic epoxy available from CCP, under the name PNE-177, with 384 g of a Bisphenol-F epoxy, available from CCP under the name BFE-170, and 265.32 g of a Cardanol epoxy, available from CCP under the name BE-255SF. The three components can be mixed simultaneously, or by sequentially mixing two components, and then adding a third component; or adding each of the three components as aliquots until the 3.1 recipe is formed. The below Table 5 illustrates the component materials and the amounts used to make the 3.1 epoxy resin.

3.1 Recipe:

TABLE 5

| Material | CCP product name | weight |
| --- | --- | --- |
| Phenolic epoxy | PNE-177 (EEW: 175 g/eq) | 1152 g |
| Bisphenol-F epoxy | BFE-170 | 384 g |
| Cardanol epoxy | BE-255SF | 265.32 g |

The recipe 3.1 is mixed and processed by the identical steps disclosed in 1.1. After the process is complete, the "3.1 epoxy resin" (EEW: 213.8 g/eq; viscosity: 5624 cps@25° C.) is obtained.

3.2 Epoxy Resin

The initial 3.1 epoxy resin described above is utilized to form a 3.2 epoxy resin. Mixing 769 g of the 3.1 epoxy resin with 738 g of a Bisphenol-F epoxy (available from CCP under the name BFE-170) and 231 g of a Cardanol epoxy, available from CCP under the name CE-500, and 231 g of TCDDM epoxy, obtained from Adeka under the names EP-4088S or EP-4088L. Table 6 illustrates the component materials and the amounts used to make the 3.2 epoxy. As with the 3.1 epoxy resin above, the components can be mixed in any order, simultaneously or sequentially, in total or in aliquots, until the 3.2 resin is obtained.

3.2 Recipe:

TABLE 6

| Material | CCP product name | weight |
| --- | --- | --- |
| 3.1 epoxy resin | | 769 g |
| Bisphenol-F epoxy | BFE-170 | 738 g |
| Cardanol epoxy | CE-500 | 231 g |
| TCDDM epoxy | EP-4088S (Adeka) or EP-4088L (Adeka) | 231 g |

The recipe 3.2 is mixed at the temperature of 80° C. for 30 minutes and the "3.2 epoxy resin" (EEW: 201 g/eq; viscosity: 913 cps@25° C.) is obtained.

Comparative Example 1

4.1 Epoxy Resin

An initial Comparative epoxy resin composition is prepared by mixing 900 g of a n epoxidized cyclohexanedimethanol (epoxidized CHDM) available from CVC Specialty Chemicals, Inc. of Morristown, N.J., (hereinafter "CVC"), under the name ERISYS GE22, with 90 g of a Bisphenol-A epoxy, available from CCP under the name BE-188. The entire components can be mixed simultaneously, or by adding each of the three components as aliquots until the 4.1 recipe is formed. The below Table 7 illustrates the component materials and the amounts used to make the Comparative 4.1 epoxy resin.

4.1 Recipe:

TABLE 7

| Material | CCP product name | weight |
| --- | --- | --- |
| epoxidized CHDM | ERISYS GE22 | 900 g |
| Bisphenol-A | BE-188 | 90 g |

CHDM has the structural formula (V):

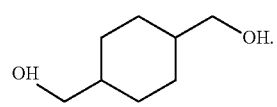

(V)

After epoxidization the structure of CHDM would be as shown in formula (VI):

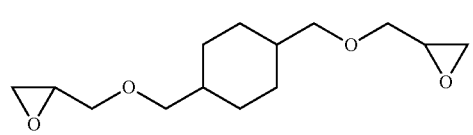

(VI)

The recipe 4.1 is mixed and processed the steps disclosed in 1.1. After the process is complete, the "4.1 epoxy resin" (EEW: 207.9 g/eq; viscosity: 571 cps@25° C.) is obtained.

4.2 Epoxy Resin

The initial 4.1 epoxy resin described above is utilized to form a 4.2 epoxy resin. Mixing 990 g of the 4.1 epoxy resin with 427.5 g of a Bisphenol-A epoxy (available from CCP under the name BE-188), 427.5 g of a Cardanol epoxy, available from CCP under the name CE-255SF, and 211.3 g of epoxidized CHDM, obtained from CVC under the name ERISYS GE22. Table 8 illustrates the component materials and the amounts used to make the 4.2 epoxy. As with the 4.1 epoxy resin above, the components can be mixed in any order, simultaneously or sequentially, in total or in aliquots, until the 4.2 resin is obtained.

4.2 Recipe:

TABLE 8

| Material | CCP product name | weight |
| --- | --- | --- |
| 4.1 epoxy resin | | 990 g |
| Bisphenol-A epoxy | BE-188 | 427.5 g |
| Cardanol epoxy | BE-255SF | 427.5 g |
| epoxidized CHDM | ERISYS GE22 (CVC Specialty Thermosets) | 211.3 g |

The recipe 4.2 is mixed at the temperature of 80° C. for 30 minutes and the "4.2 epoxy resin" (EEW: 208 g/eq; viscosity: 1080 cps@25° C.) is obtained.

Preparing Recipe for a Coating Composition

In order to prepare a varnish formulation comprising the high solids content epoxy resin blends, various solvents, such as PM acetate (Propylene Glycol Monomethyl Ether Acetate), Xylene and MIBK (Methyl Isobutyl Ketone) are mixed as part of a "Part A" in varnish formula 1. The components and amounts are set forth in the following Table 9:

Formula 1 (for Preparing a Varnish):

TABLE 9

| Material | Supplier | Weight (g) |
|---|---|---|
| Part A | | |
| Resin composition | | 86 |
| PM acetate* | CCP | 0.53 |
| Xylene* | | 5.07 |
| dispersing to 5-6 Hegman with high speed (3000 rpm) and adding the material described below after the speed is reduced | | |
| MIBK* | | 0.82 |
| Xylene* | | 0.68 |
| Part B | | |
| Polyamine** | TrueTime Industrial Co. | 39.09 |

*PM acetate, Xylene, MIBK are used as the solvents in the formula.
**Polyamine is used as the hardener in the formula.

In a second formulation, various epoxy resins of the Examples and Comparative Examples are formulated into coatings containing various pigments, together with excipients, such as wetting agents, defoaming agents, leveling agents, and weathering resistance agents. The components and amounts for Formula 2 are found in Table 10.

Formula 2:

TABLE 10

| Material | Supplier | Weight (g) |
|---|---|---|
| Part A | | |
| Resin composition | | 86 |
| NUOSPERSE FA196 | ELEMENTIS Specialties, PLC | 0.49 |
| Defom 3500 Defoamer | ELEMENTIS Specialties, PLC | 0.2 |
| BYK 361N | BYK | 0.2 |
| TiO$_2$ R960 | DuPont | 25.86 |
| BaSO4 BLANC FIXE MICRO | SACHTLEBEN Chemie | 25.89 |
| PM acetate | CCP | 0.53 |
| Xylene | | 5.07 |
| dispersing to 5-6 Hegman with high speed (3000 rpm) and adding the material described below after the speed is reduced | | |
| MIBK | | 0.86 |
| Xylene | | 3.7 |
| Part B | | |
| Polyamine | TrueTime Industrial Co. | 39.09 |

The results of formed coatings on a substrate are compared in the following Tables for the weight per epoxide ("WPE"), percentage of solids, volatile organic components ("VOC") and physical properties, such as viscosity, pot-life, dry-to-touch time, tack-free time, pencil hardness, impact resistance and rubbing resistance.

Experimental Results of the Coating Composition Formula 1:

TABLE 11

| Resin composition | BE-200HS | 3.2 epoxy resin |
|---|---|---|
| WPE (g/eq) | 203 | 213 |
| Solid content (wt %) | 96 | 96 |
| VOC (g/L)*$^A$ | 36 | 36 |
| Viscosity (cps@25° C.)*$^B$ | 1530 | 1950 |

TABLE 11-continued

| Resin composition | BE-200HS | 3.2 epoxy resin |
|---|---|---|
| Amenable to airless spray application | Yes | Yes |
| Pot-Life (hrs)*$^C$ | 2 | 0.9 |
| Dry-to-touch time (hrs)*$^C$ | 1.3 | 1.1 |
| Tack-free-time (hrs)*$^C$ | 1.8 | 1.7 |
| Dry-hard-time (hrs)*$^C$ | 2.4 | 2.1 |
| Dry-through-time (hrs)*$^C$ | 3.6 | 3.4 |
| Pencil hardness*$^D$ | H | H |
| Impact test*$^E$ | 1 kg/50 cm (pass) | 1 kg/50 cm (pass) |
| MEK rub test*$^F$ | 200 (pass) | 200 (pass) |

Formula 2:

TABLE 12

| Resin composition | BE-200HS | 2.2 epoxy resin | 3.2 epoxy resin | 4.2 epoxy resin | BE-188*$^G$ | BE-501X75*$^H$ |
|---|---|---|---|---|---|---|
| WPE (g/eq) | 203 | 203 | 213 | 170 | 186 | 500 |
| Solids content (wt %) | 95 | 95 | 95 | 90 | 93.6 | 50.8 |
| VOC (g/L)*$^A$ | 66 | 66 | 66 | 85 | 84 | 470 |
| Viscosity*$^B$ (cps@25° C.) | 1550 | 1460 | 1750 | 2000 | 5600 | 20 |
| Amenable to airless spray application | Yes | Yes | Yes | Yes | No | Yes |
| Pot-Life (hrs)*$^C$ | 2 | 1.8 | 1.3 | 0.55 | 0.5 | >4 |
| Dry-to-touch time (hrs)*$^C$ | 1.3 | 1.2 | 1.1 | 1.9 | 0.5 | 2.4 |
| Tack-free-time (hrs)*$^C$ | 1.7 | 2.6 | 1.4 | 2.9 | 1.3 | 3.6 |
| Dry-hard-time (hrs)*$^C$ | 2.4 | 5.3 | 2.3 | 3.3 | 1.8 | 7.8 |
| Dry-through-time (hrs)*$^C$ | 3.5 | 7.5 | 2.9 | 6.6 | 3.2 | 16 |
| Pencil hardness*$^D$ | H | F | H | H | 2H | F |
| Impact test*$^E$ | 1 kg/50 cm (pass) | 500g/50 cm (pass) | 1 kg/50 cm (pass) | 1 kg/50 cm (pass) | 500 g/30 cm (fail) | 500 g/30 cm (pass) |
| MEK rub test*$^F$ | 200 (pass) | 200 (pass) | 200 (pass) | 200 (pass) | 200 (pass) | 11 (fail) |

*$^A$The VOC value is calculated by following:

$$\frac{\text{solvent weight (g)}}{\text{total volume (L)}}.$$

*$^B$10 parts by weight xylene was used to dissolve 90 parts by weight coating composition. The viscosity was tested using a Brookfield CAP 2000+ viscometer, 6# rotator, 400 rpm at 25° C.
*$^C$Pot-Life, Dry-to-touch time, Dry-hard-time, Tack-free-time, and Dry-through-time were measured by dragging a needle through the coating using a BK drying time recorder according to the procedure described in ASTM D5895-03 (herein incorporated by reference).
*$^D$Pencil hardness is measured according to the procedure described in ASTM D3363 (herein incorporated by reference).
*$^E$Impact resistance was measured according to ASTM D-2794, incorporated herein by reference.
*$^F$Solvent resistance is measured according to the methyl ethyl ketone (MEK) double rub test. The MEK rub test was performed according to the procedure described in ASTM D5402 (herein incorporated by reference). The test was performed using a semi-automatic MEK Rub Test machine made by DJH DESIGNS INC. The testing continued until the coating was rubbed through to the substrate or a maximum of 200 double rubs were completed without breakthrough.
*$^G$The solvent type epoxy resin which can be purchased from CCP.
*$^H$The solid type epoxy resin which can be purchased from CCP.

Based on the experimental results shown in table 12, it is clear that the coating compositions prepared from the modified epoxy resins (i.e., BE-200HS, 2.2 epoxy resin, and 3.2 epoxy resin) can perform lower viscosity and VOC. Thus, they can meet the requirement of environment and processability. Furthermore, compared to coating compositions prepared from the 4.2 epoxy resin, and CCP BE-188, the ones using the modified epoxy resins can perform longer pot-life. In this respect, pot-life suggest the operation window of paint, thus the longer pot-life is preferred. Compared to coating compositions prepared from the 4.2 epoxy resin, and CCP BE-501X75, the ones using the modified epoxy resins can perform shorter tack-free-time. In this respect, tack-free-time is a probe of drying time and the smaller value means shorter drying time and faster drying speed, which is preferred. Moreover, the experimental results also show that the coating compositions prepared from the modified epoxy resins perform excellent solvent resistance. Given the above, it is clear that the modified epoxy resin not only show low viscosity and VOC, but excellent properties of drying and solvent resistance.

This disclosure also contemplates articles of manufacture comprising a substrate coated with the compositions according to this disclosure. Suitable substrates by way of example, and not limitation, include ferrous and non-ferrous metals, including iron and its alloys, aluminum and its alloys; inorganic substrates, including inorganic cements, concrete, brick, tile, stone; and organic substrates, such as wood and bamboo. The resin composition can be applied as a coating by brushing, dipping, falling curtain, and airless spray application.

Although, we have exemplified the composition of the disclosure by way of description of essential components, it should be understood that the addition of optional components, such as conventional additives to modify impact resistance, flexibility, and other aesthetic additives, including dyes, pigments, extenders, levelers, and other conventional coating additives are within the scope of the appended claims.

Although we have disclosed our embodiments, they must be viewed as exemplary, rather than limiting, as those skilled in the art, to which this disclosure is directed, will readily envision modifications of the disclosed embodiments and other embodiments within the scope of the appended claims, without the exercise of invention.

We claim:

1. A resin composition comprising:
   a component (i): an epoxy resin comprising an epoxidized tricyclo decanedimethanol, and
   a component (ii): an epoxy resin comprising an epoxidized cardanol.

2. The resin composition according to claim 1, further comprising at least one component (iii) which comprises one epoxy resin other than the component (i) and the component (ii).

3. The resin composition according to claim 2, wherein the component (iii) is one selected from the group consisting of epoxidized Bisphenol-A, epoxidized Bisphenol-F, epoxidized Bisphenol B, epoxidized Bisphenol BP, epoxidized Bisphenol E, epoxidized Bisphenol G, epoxidized Bisphenol P, epoxidized Bisphenol PH, epoxidized Bisphenol TMC, epoxidized Bisphenol Z, epoxidized Bisphenol-S, epoxidized Bisphenol-H, epoxidized Bisphenol-C, epoxidized Bisphenol-AF, epoxidized novolac, epoxidized phenol, epoxidized glycidylamine, brominated epoxy resin, epoxidized cyclohexane-1,4-dimethanol, epoxidized decalin-2,6-dimethanol, epoxidized norbornane dimethanol, epoxidized dicyclopentadiene, epoxidized tricyclopentadiene, epoxidized pentacyclopentadecane, epoxidized tricyclodecane dicarbaldehyde, epoxidized pentacyclopentadecane dicarbaldehyde, and combinations thereof.

4. The resin composition according to claim 2, wherein the component (iii) is at least one selected from the group of epoxidized Bisphenol-A, epoxidized Bisphenol F, epoxidized phenol, and combinations thereof.

5. The resin composition according to claim 1, wherein the tricyclo decanedimethanol has the structure of formula (I):

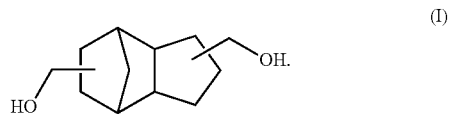

6. The resin composition according to claim 1, wherein the tricyclo decanedimethanol is one selected from the group consisting of
   3,8-bis(hydroxymethyl)tricyclo[5.2.1.0$^{2-6}$]decane;
   3,9-bis(hydroxymethyl)tricyclo[5.2.1.0$^{2-6}$]decane;
   4,8-bis(hydroxymethyl)tricyclo[5.2.1.0$^{2-6}$]decane;
   4,9-bis(hydroxymethyl)tricyclo[5.2.1.0$^{2-6}$]decane;
   5,8-bis(hydroxymethyl)tricyclo[5.2.1.0$^{2-6}$]decane;
   5,9-bis(hydroxymethyl)tricyclo[5.2.1.0$^{2-6}$]decane and combinations thereof.

7. A coating composition comprising the resin composition according to claim 1 and a hardener.

8. The coating composition according to claim 7, wherein the hardener comprises a polyamide, an isophorone diamine, a bisaminomethylcyclohexane, a bis(aminocyclohexyl)methane, a metaxylene diamine, a diaminocyclohexane, a ethylenediamine, a diethylenetriamine, a triethylenetetramine, or a tetraethylenepentamine.

9. The coating composition according to claim 7, which is photo-initiator free.

10. The coating composition according to claim 7, exhibiting a viscosity of at most about 2000 cps.

11. The coating composition according to claim 7, exhibiting a viscosity of at most about 1800 cps.

12. The coating composition according to claim 7, wherein the solids content of the coating composition is in the range of about 90 wt. % to about 99 wt. % based on the total weight of the coating composition.

13. The coating composition according to claim 7, exhibiting a VOC content of at most about 85 g/L.

14. The coating composition of claim 7, exhibiting a VOC content of at most about 70 g/L.

15. An article of manufacture comprising a substrate and a coating formed by curing the coating composition of claim 7.

16. The article of manufacture according to claim 15, wherein the substrate is metals, concrete or wood.

17. The article of manufacture according to claim 15, exhibiting an impact strength of at least of about 500 g/50 cm.

18. The article of manufacture according to claim 15, exhibiting a pencil hardness of at least of H.

19. The article of manufacture according to claim 15, exhibiting a MEK rub test of at least of about 200.

* * * * *